(12) United States Patent
Tanaka et al.

(10) Patent No.: US 8,284,299 B2
(45) Date of Patent: Oct. 9, 2012

(54) SOLID STATE IMAGING DEVICE FOR CORRECTING LEVEL VARIATIONS IN OUTPUT SIGNALS

(75) Inventors: Hiromichi Tanaka, Daito (JP); Hideto Yoshimura, Daito (JP); Sumio Terakawa, Ibaraki (JP); Masafumi Kimata, Shiga-ken (JP)

(73) Assignee: Funai Electric Co., Ltd., Daito-shi (JP)

( * ) Notice: Subject to any disclaimer, the term of this patent is extended or adjusted under 35 U.S.C. 154(b) by 1525 days.

(21) Appl. No.: 11/473,138

(22) Filed: Jun. 23, 2006

(65) Prior Publication Data

US 2006/0290797 A1    Dec. 28, 2006

(30) Foreign Application Priority Data

Jun. 23, 2005   (JP) .................................. 2005-182744

(51) Int. Cl.
*H04N 5/235* (2006.01)
(52) U.S. Cl. ........................................................ 348/362
(58) Field of Classification Search .................... 348/362
See application file for complete search history.

(56) References Cited

U.S. PATENT DOCUMENTS

| 7,312,823 B1 * | 12/2007 | Mori | 348/269 |
| 7,515,179 B2 * | 4/2009 | Han et al. | 348/226.1 |
| 2002/0085112 A1 * | 7/2002 | Hiramatsu et al. | 348/362 |
| 2003/0030744 A1 * | 2/2003 | Baer | 348/370 |
| 2003/0142239 A1 * | 7/2003 | Yoshida et al. | 348/607 |

FOREIGN PATENT DOCUMENTS

| JP | 06-253216 A | | 9/1994 |
| JP | 8-294058 A | | 11/1996 |
| JP | 2000-32352 A | | 1/2000 |
| JP | 2002135647 A | * | 5/2002 |
| JP | 2003-32551 A | | 1/2003 |
| JP | 2005-27137 A | | 1/2005 |

OTHER PUBLICATIONS

Japanese Office Action dated May 11, 2010 with English translation (seven (7) pages).

* cited by examiner

*Primary Examiner* — Usman Khan
(74) *Attorney, Agent, or Firm* — Crowell & Moring LLP

(57) ABSTRACT

A solid state imaging device detects the period of energy variation of discharge type illumination, and sets a total exposure time to match the detected period. The total exposure time is divided into alternating valid and invalid exposure times by a division ratio to make the sum of the valid exposure times equal to an actual exposure time corresponding to an actual speed of an electronic shutter. Charges accumulated in a CMOS sensor during the valid exposure times are stored in a floating diffusion, whereas charges accumulated during the invalid exposure times are drained. At the end of the total exposure time, the charges stored during the valid exposure times are converted to an electrical signal which is output to a signal processing circuit. This device can correct variation of output signals which corresponds to the illumination energy variation when the shutter is operated for imaging under high luminance illumination.

12 Claims, 11 Drawing Sheets

SOLID STATE IMAGING DEVICE FOR CORRECTING LEVEL VARIATIONS IN OUTPUT SIGNALS

BACKGROUND OF THE INVENTION

1. Field of the Invention

The present invention relates to a solid state imaging device, more particularly to a technology for correcting level variations in output signals from a solid state imaging device using an X-Y address type solid state imaging element for sequentially reading out pixel signals from pixels by X-Y addressing.

2. Description of the Related Art

A CCD (Charge Coupled Device) sensor and a CMOS (Complementary Metal Oxide Semiconductor) sensor are widely known as solid state imaging elements to be used for imaging devices such as a video camera and a digital camera. Among them, recently, the CMOS sensor has tremendously been improved in sensitivity. However, this causes a problem that when correcting or significantly reducing level variations in output signals from an imaging device using a CMOS sensor, a conventional correction method to adjust the exposure time of an electronic shutter to the period of the field or frame frequency of the CMOS sensor may not be able to perform the correction. This will be described in detail below.

Level variation of output signals is a phenomenon that occurs when an imaging device is used for imaging under illumination of a discharge type light source using an AC power supply such as a fluorescent lamp or a mercury lamp. When an X-Y address type solid state imaging element such as a CMOS sensor, in which each exposure is made for each pixel (pixel by pixel) or for each scan line (scan line by scan line), is used for imaging under the discharge type illumination, the timing for accumulating or storing charge varies for each pixel or each scan line. Accordingly, when an electronic shutter is released at a high speed, the shutter time may be shorter than the period of energy variation of the discharge type illumination, which causes each signal output from each pixel or scan line to vary in level or amplitude. This causes output signals varying in level or amplitude for each scan line, whereby so-called horizontal stripe noise occurs in the resultant image data from the imaging device. This is the phenomena called level variation.

If the discharge type illumination has a low luminance (intensity), it is possible to correct the level variation by selecting the exposure time of the electronic shutter to be equal to the period, or an integer multiple of the period, of the field frequency period) or the frame frequency of the CMOS sensor. However, if the illumination has a high luminance, the exposure time of the electronic shutter of the CMOS sensor may be required to be shorter than the period of the field or frame frequency of the CMOS sensor, preventing the exposure time from coinciding with the field or frame frequency. This will be described in more detail below.

Reference is made to FIG. 12, which is a timing chart of signals in a light source and a CMOS sensor according to a conventional solid state imaging device, where FIG. 12(a) is a graph showing a frequency of the light source or illumination, and FIG. 12(b) is a graph showing a period of energy variation of the light source or illumination. On the other hand, each of FIG. 12(c) and FIG. 12(e) is a chart showing an exposure time for each scan line in sequential exposure for individual scan lines, while each of FIG. 12(d) and FIG. 12(f) is a graph showing a waveform of output signals from the individual scan lines, representing levels or amplitudes (i.e. amounts of energy) of the output signals in sequential fields (or frames).

When the exposure time is $\Delta t1$ as shown in FIG. 12(c) which is equal to, or 1 multiple of, the period of energy variation as shown in FIG. 12(b), the levels or amplitudes of the output signals from the individual scan lines are constant or uniform as shown in FIG. 12(d). However, when the exposure time is $\Delta t2$ as shown in FIG. 12(e) which is shorter than the period of energy variation shown in FIG. 12(b) (for example, when the electronic shutter is released at a high speed), the amounts of energy of the light source accumulated for individual scan lines vary depending on the timing of exposure. As a result, the levels of the output signals from the individual scan lines vary as shown in FIG. 12(f). If such signals with the level variation are output from an imaging device, resultant image data from the imaging device generates horizontal stripe noise such that bright horizontal stripes and dark horizontal stripes appear in an alternating sequence in the scan lines.

In summary, the conventional correction method for a solid state imaging device using a CMOS sensor is to make the period of energy variation of the illumination equal to, or 1 multiple of, the field or frame frequency (rate) or the exposure time of an electronic shutter. However, the conventional correction method has a limitation in the ability to correct the level variation of output signals if the CMOS sensor has improved sensitivity to cause short exposure time as described above. As a result, the level variation of the output signals occurs which cannot be corrected or significantly reduced by the conventional correction method, causing low quality of images taken by the imaging device.

In contrast to the CMOS sensor, the problem described above does not occur in a CCD sensor due to its technical characteristics. This can be understood from FIG. 13, which is a timing chart of signals in a light source and a CMOS sensor according to a conventional solid state imaging device, where FIG. 13(a) is a graph showing a frequency of the light source (illumination), and FIG. 13(b) is a graph showing a period of energy variation of the light source. On the other hand, each of FIG. 13(c) and FIG. 13(e) is a chart showing an exposure time for each scan line in sequential exposure for individual scan lines, while each of FIG. 13(d) and FIG. 13(f) is a graph showing a waveform of output signals from the individual scan lines, representing levels or amplitudes (i.e. amounts of energy) of the output signals in sequential fields (or frames).

In the case of a charge transfer type solid state imaging device such as a CCD sensor, the accumulation of signal charges for all pixels starts at the same time, and the signal charges are read out from the pixels simultaneously (refer to FIG. 13). Accordingly, the accumulation time of signal charge (exposure time) is constant for all the pixels, so that the level variation among individual scan lines (inter-scan line variation) does not occur. However, even in the CCD sensor, inter-field or inter-frame level variation (flicker) may occur if the period of energy variation of the discharge type illumination is different from the field frequency or the frame frequency of output signals as in the case of FIG. 13(b) and FIG. 13(c).

A possible method for correcting the level variation (flicker) is to make the exposure time of the electronic shutter equal to the period, or a multiple of the period, of the energy variation of the discharge type illumination as shown in FIG. 13(e), thereby preventing flicker between fields or frames (inter-field or inter-frame flicker) from occurring. Furthermore, in the case of the CCD sensor, even if the exposure time of the electronic shutter cannot be made equal to the period, or a multiple of the period, of the field or frame frequency, or even if the illumination has a high luminance, it is possible to correct or significantly reduce flicker by varying the gain (amplification factor) of the output signals among periods of the field or frame frequency (inter-period variation).

On the other hand, in the case of the CMOS sensor, which is an X-Y address type solid state imaging element, the levels or amplitudes of the output signals vary among individual scan lines or individual pixels (inter-scan line or inter-pixel variation). This is regardless of the frequency of the illumination, whether 50 Hz or 60 Hz. Accordingly, the method for correcting the level variation and flicker in the CCD sensor cannot be used in the same manner for the CMOS sensor. Further, the level variation of the CMOS sensor increases with the increase of the luminance, so that the CMOS sensor has been considered unsuitable for use as a sensor in a solid state imaging device such as a digital camera which requires high sensitivity. Thus, the mainstream technology has been to use, as a solid state imaging element, the CCD sensor that enables correction of the level variation and flicker relatively easily.

Several technologies have been proposed to solve the problem occurring in the CMOS sensor. For example, Japanese Laid-open Patent Publication 2003-032551 discloses a solid state imaging element and a method for driving the same as well as an imaging device using the same that can reduce flicker which occurs when a high speed electronic shutter is released for imaging under illumination of a discharge type light source. According to this patent publication, at least two divided exposure times are set for each pixel in a CMOS sensor, in which the exposure start time of each divided exposure time is determined on the basis of the period of energy variation of the illumination.

For example, if the frequency of the illumination is 50 Hz, and if two divided exposure times are used, a period of energy variation of the illumination of 10 msec, which is one period here, is divided into two 5 ms durations. A set of two exposures, each of which has an exposure time of half of normal exposure time, is made starting from the start of each of the two 5 ms durations. In other words, a first exposure is made at normal timing or normal start time (with exposure time which is half of the normal exposure time). Thereafter, a second exposure is made at a point delayed by 5 ms from the normal start time (also with half of the normal exposure time). In the CMOS sensor, charges are generated by the two exposures, and are integrated and output as output signals so as to correct or significantly reduce the level variation and flicker.

This correction method of Japanese Laid-open Patent Publication 2003-032551 is disadvantageous in that the period of energy variation of the illumination is not related to the length of the exposure time. If the exposure time is an integer multiple of the illumination frequency, the amount of the integrated signal charges to be output is constant or uniform, whereby sufficient correction can be achieved. However, if the exposure time is not an integer multiple of the illumination frequency, the amount of the integrated signal charges to be output is not constant. Accordingly, although it may be possible to reduce the level variation and flicker to some extent, it is not possible to correct or eliminate them.

Another technology is proposed in Japanese Laid-open Patent Publication Hei 6-253216. This patent publication discloses an interline CCD sensor, and a method for driving the same so as to adjust the exposure time. The interline CCD sensor is formed such that vertical registers are provided between sensor cells (e.g. photodiodes) for generating and accumulating signal charges, in which the accumulated signal charges are transferred to the vertical registers, and are read out by providing the vertical registers with vertical transfer clock signals.

The method for driving the CCD sensor according to this patent publication has an imaging time which is stopped by applying, to the vertical registers, a voltage to cause a transfer of signal charges from the sensor cells. The imaging time is divided into N (N being integer, N≧2) time periods each of which is divided into a drain period (invalid exposure time), in which signal charges accumulated in the sensor cells are drained, and an accumulation period (valid exposure time) in which signal charges are accumulated in the sensor cells. A feature of this method for driving the CCD sensor is that the invalid exposure times are controlled so as to control the sensitivity of the CCD sensor, while the signal charges transferred to the vertical registers are read out by providing the vertical registers with the vertical transfer clock signals.

However, a problem arises in the driving method of Japanese Laid-open Patent Publication Hei 6-253216 if it is used with a CMOS sensor. More specifically, the driving method of this patent publication can be used only with a charge transfer type solid state imaging element such as a CCD sensor, which has a mechanism of selective transfer of charges, either to transfer signal charges accumulated in the sensor cells to the vertical registers, or to drain the accumulated charges to or toward the substrate (such as a readout gate and a charge drain mechanism). For this reason, the driving method of this patent publication cannot be used for an X-Y address type solid state imaging element such as a CMOS sensor, which outputs signals from each scan line, scan line-by-scan line. This means that this driving method cannot be used by itself, and requires some improvement or combined use of another function (e.g. use of a global shutter), so as to be usable for the CMOS sensor.

A technology to solve the problem occurring in the CMOS sensor is proposed in Japanese Laid-open Patent Publication 2005-27137. This patent publication discloses an imaging device using e.g. a CMOS sensor that can reduce flicker in imaging under illumination with energy variation, and reduce distortion when imaging a moving object. When used for imaging under discharge type illumination with a predetermined illumination frequency, the imaging device of this patent publication sets a predetermined continuous exposure time in each vertical interval corresponding to the predetermined illumination frequency, and obtains a base divisor determined by the phase difference between the set exposure time and the vertical sync frequency. The exposure time is divided by an integer multiple of the base divisor to determine division points in the exposure time. Taking the thus determined division points as starting points of exposure and readout, the imaging device performs exposure and signal readout simultaneously or substantially simultaneously at the division points. The thus read out signals are integrated for each pixel, pixel-by-pixel, so as to generate an image signal.

In the imaging device of this Japanese Laid-open Patent Publication 2005-27137, the area of an imaging element is divided, and accumulated charges are read out from the divided areas by shifting the readout timing for each of the respective divided areas. However, a problem of complexity in device configuration arises in the imaging device of this patent publication. More specifically, this imaging device requires external memories for integrating the accumulated charges in the respective divided areas, so that the device configuration requires some addition or modification. Furthermore, in order to increase the accuracy of correction of the flicker, it is necessary to increase the number of divided areas and the number of corresponding external memories. This causes the imaging device and its process to inevitably be complex and costly (e.g. cost increase due to the increase of external memories).

SUMMARY OF TEE INVENTION

It is an object of the present invention to provide a solid state imaging device with simple and inexpensive configuration that can reduce or correct level variation of output signals (variation in the amount of output signals) caused by variation in the amount of energy of illumination when imaging, using a solid state imaging element such as a CMOS sensor, under discharge type illumination e.g. with high luminance.

According to the present invention, this object is achieved by a solid state imaging device comprising: a variation detecting means for detecting the period of energy variation of discharge type illumination; an exposure time determining means for determining an exposure time set for each frame or each field in imaging based on the period of energy variation detected by the variation detecting means; an imaging means for imaging, using an X-Y address type solid state imaging element for photoelectrically converting incident light to charges and accumulating the charges in an exposure time; a dividing means for dividing the exposure time into a plurality of exposure times; a separating means for separating the plurality of exposure times, divided by the dividing means, into valid exposure times and invalid exposure times; and a selective output means for selectively integrating charges accumulated in the imaging means during the valid exposure times among charges accumulated in the imaging means during the exposure time, and for outputting a signal based on the integrated charges.

The solid state imaging device according to the present invention can detect the period of energy variation of discharge type illumination such as illumination of a fluorescent lamp, and can set an exposure time (i.e. total exposure time in which charges are accumulated by the X-Y address type solid state imaging element) to match the detected period of energy variation of the discharge type illumination. The total exposure time can be divided into alternating valid and invalid exposure times by a division ratio to make the sum of the valid exposure times equal to an actual exposure time corresponding to an actual speed of an electronic shutter. Charges accumulated in the X-Y address type solid state imaging element during the valid exposure times can be stored e.g. in a floating diffusion (FD) which serves as a capacitor, whereas charges accumulated during the invalid exposure times can be drained. At the end of the total exposure time, the charges (only the charges) stored during the valid exposure times can be converted to an electrical signal which is output to a signal processing circuit of the solid state imaging device.

Thus, according to this solid state imaging device using the X-Y address type imaging element, it is possible to prevent output signals of the imaging element from varying in amplitude corresponding to the period of energy variation of the illumination (i.e. it is possible to correct level variation and flicker), even if discharge type illumination is used for the illumination under which imaging is performed, and even if the exposure time (total exposure time) is shorter than the period of energy variation of the discharge type illumination. As a result, normal images can be obtained even if imaging is performed with high sensitivity (imaging with a short exposure time) under discharge type illumination e.g. of a fluorescent lamp. Accordingly, the X-Y address type solid state imaging element (CMOS sensor) can be used in place of a CCD sensor as a two-dimensional image sensor in the solid state imaging device such as a camcorder which mainly handles moving images. The solid state imaging device according to the present invention can correct the level variation and flicker basically under any illumination such as high frequency illumination so as to obtain normal images.

Preferably, the variation detecting means uses a light receiving element such as a photodiode, placed to face an object to be captured, for detecting the period of energy variation of the discharge type illumination. This makes it possible to more securely detect the period (frequency) of energy variation of the illumination, achieving more secure performance of the solid state imaging device, including setting of the total exposure time matched to the period of energy variation of the illumination.

Further preferably, the variation detecting means detects the period of energy variation of illumination based on an output signal of the imaging element in which the output signal of the imaging element contains energy variation components of the light source, the energy variation components of the light source being held for a predetermined time. The use of the imaging element for the detection of the illumination energy variation period makes it possible to eliminate the need for another detector such as a photodiode for the detection, and thereby reduce the number of components in the solid state imaging device, reducing the size and cost.

Still further preferably, among the charges accumulated by the imaging means, the charges accumulated during the invalid exposure times are drained scan line-by-scan line to a substrate of the imaging element. According to this preferred mode, charges accumulated during an invalid exposure time or times (i.e. charges which are not used) can be drained to the substrate at an optional timing for a selected scan line or lines, scan line-by-scan line, in a solid state imaging device, for example, with a CMOS sensor of four transistor (4T) type (in which the resetting of charge of a photodiode is not performed by using a reset transistor) by selecting or assigning the scan line or lines, scan line-by-scan line. Thus, it is possible to accumulate and drain the charges corresponding to the valid exposure times and invalid exposure times, respectively, for an individual scan line or lines, scan line-by-scan line, independently.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein.

DESCRIPTION OF THE PREFERRED EMBODIMENTS

Figure 1:
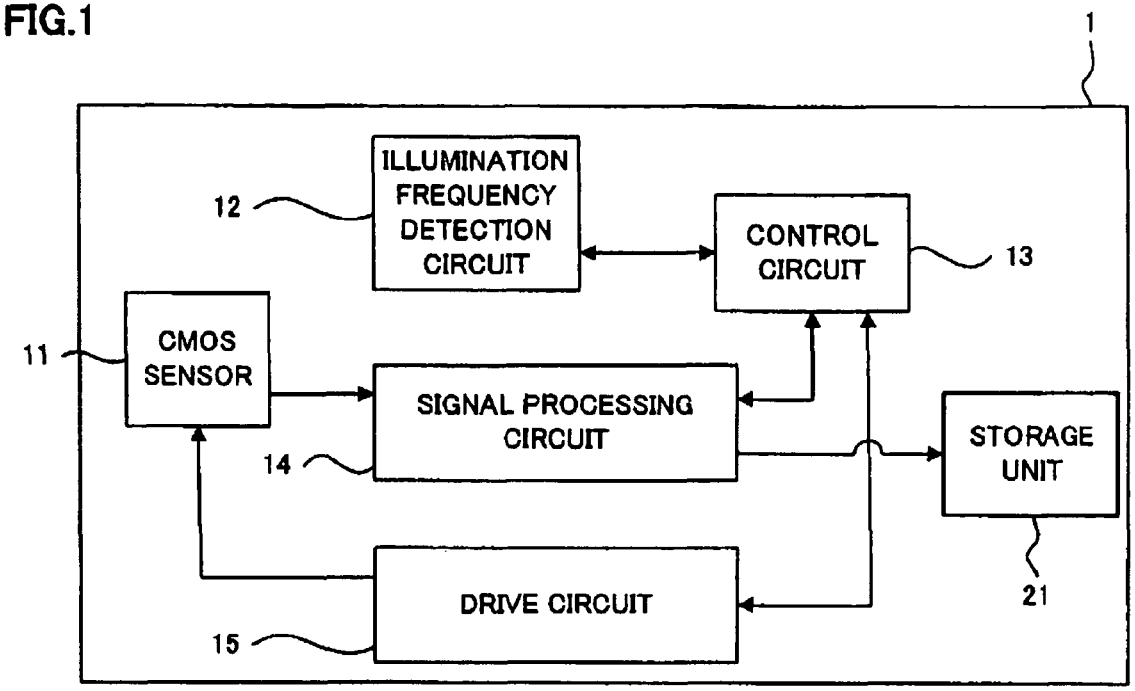
FIG. 1 is a schematic block diagram of an example of an electrical circuit of a solid state imaging device according to the present invention.

Embodiments of the present invention, as best mode for carrying out the invention, will be described hereinafter with reference to the drawings. The present invention relates to a solid state imaging device which can correct or significantly reduce level variation and flicker. It is to be understood that the embodiments described herein are not intended as limiting, or encompassing the entire scope of, the present invention. Note that like parts are designated by like reference numerals or characters throughout the drawings.

<1. Main Structure of Electric Circuit of Solid State Imaging Device>

FIG. 1 is a schematic block diagram of an example of an electrical circuit of a solid state imaging device 1 according to the present invention. As shown in FIG. 1, the solid state imaging device 1 comprises a CMOS (Complementary Metal Oxide Semiconductor) sensor 11, an illumination frequency detection circuit 12, a control circuit 13, a signal processing circuit 14, a drive circuit 15 and a storage unit (memory) 21.

The CMOS sensor 11 is an image sensor using a CMOS technology, which uses free electrons and holes to transfer charges. Signal charges generated by incident light (exposure) and accumulated in an exposure time (described later) are amplified for each pixel, pixel-by-pixel, and the pixels are selected by X-Y addressing so as to output electrical signals, either voltage signals or current signals. Thus, the CMOS sensor 11 and related elements serve as claimed "imaging means for imaging, using an X-Y address type solid state imaging element for photoelectrically converting incident light to charges and accumulating the charges in an exposure time". The CMOS sensor has an advantage over a conventional CCD (Charge Coupled Device) sensor in that the CMOS sensor can be operated with a power of about one tenth of that for the CCD sensor, so that it can be operated with a single low voltage, making it possible to integrate the CMOS sensor with peripheral circuits. Although it has had a disadvantage of lower sensitivity than the CCD sensor, the CMOS sensor 11 has been technologically improved in recent years to increase the sensitivity. As apparent from the descriptions later, the CMOS sensor 11 can be used in place of a CCD sensor as a two-dimensional image sensor in a solid state imaging device 1 such as a camcorder which mainly handles moving images.

Figure 2:
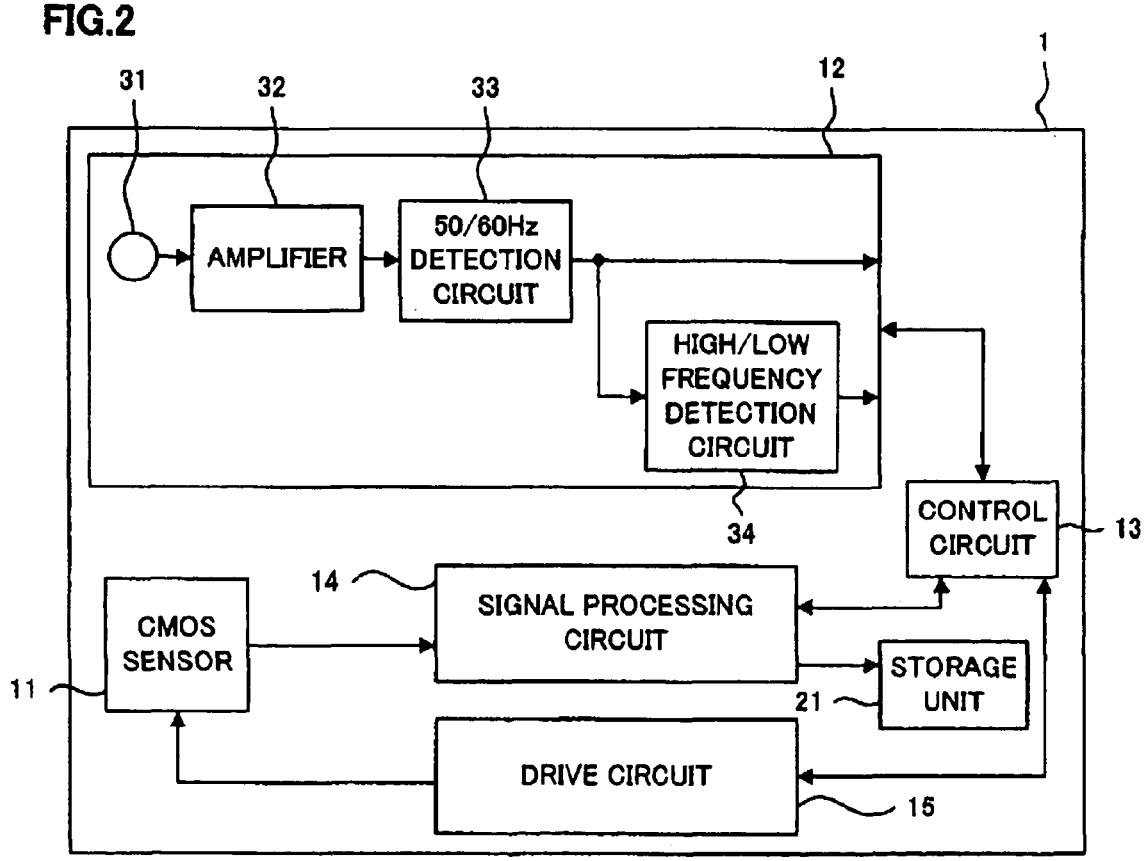
FIG. 2 is a schematic block diagram of the solid state imaging device showing a specific example of an illumination frequency detection circuit.

The illumination frequency detection circuit 12 is a circuit for detecting and determining the power supply frequency (e.g. 50 Hz or 60 Hz) and the illumination frequency (high or low) of the light source, using the CMOS sensor 11 and/or a separate sensor 31 placed to face an object to be captured. When the CMOS sensor 11 is used for this purpose, the illumination frequency detection circuit 12 detects variation of signals output from the CMOS sensor 11, serving to determine the frequency of incident light (illumination) received by the CMOS sensor 11. Referring to FIG. 2, which is a schematic block diagram of the solid state imaging device 1 showing a specific example of the illumination frequency detection circuit 12, the illumination frequency detection circuit 12 comprises a separate sensor (light receiving element) 31, an amplifier (amplifier circuit or amplifier element) 32, a 50/60 Hz detection circuit 33 and a high/low frequency detection circuit 34.

The sensor 31 comprises a light receiving element (e.g. photodiode which can be referred to simply as "PD") which converts incident light to a signal charge and accumulates the signal charge, and which is used to receive illumination whose frequency is to be determined. For example, the sensor 31 is placed on a front surface of the solid state imaging device 1 so as to face an object to be captured, and converts the energy of a discharge type illumination (light source) to charges. Examples of the discharge type light source are a fluorescent lamp and a mercury lamp. The amplifier 32 amplifies and outputs the signal charge accumulated in the sensor 31 to another circuit. The 50/60 Hz detection circuit 33 receives the signal charge from the amplifier 32, and determines the frequency of the incident light received by the sensor 31 based on the received signal charge, whether it is 50 Hz or 60 Hz. The 50/60 Hz detection circuit 33 sends its output signal to the control circuit 13 and the high/low frequency detection circuit 34. The high/low frequency detection circuit 34 receives the output signal from the 50/60 Hz detection circuit 33, and determines the illumination frequency whether it is high frequency or low frequency. Besides, the signal processing circuit 14 includes a high/low luminance detection circuit 35 for detecting and determining, based on the output signal of the CMOS sensor 11, whether the luminance (intensity) of incident light (illumination) received by the CMOS sensor 11 is high or low.

Figure 3:
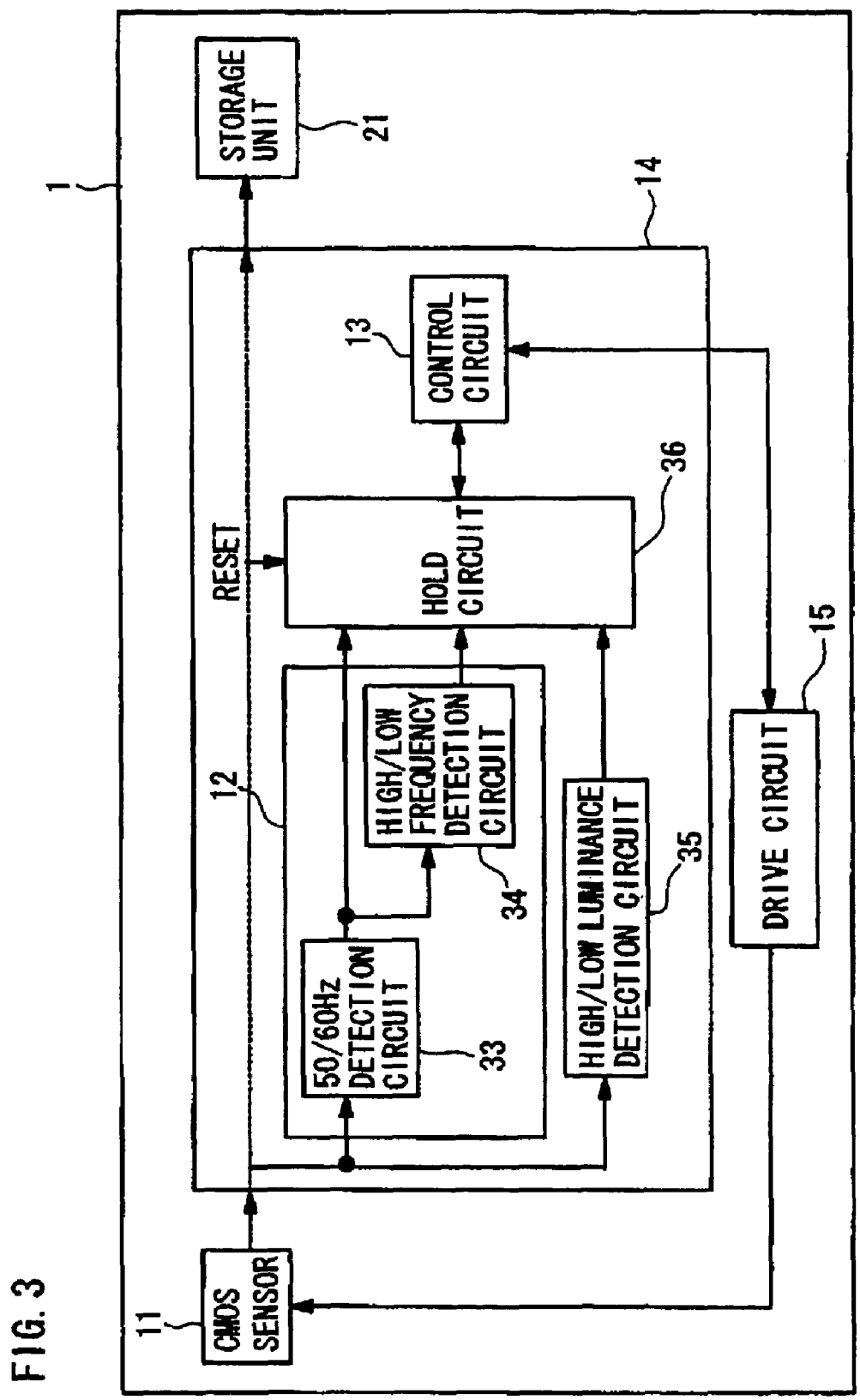
FIG. 3 is a schematic block diagram of another example of the solid state imaging device.

Reference is now made to FIG. 3 which is a schematic block diagram of another example of the solid state imaging device 1. As shown in FIG. 3, the illumination frequency detection circuit 12 can be incorporated into the signal processing circuit 14, in which the illumination frequency detection circuit 12 here comprises a 50/60 Hz detection circuit 33 and a high/low frequency detection circuit 34. The signal processing circuit 14 further comprises: a control circuit 13 to control the entire solid state imaging device 1; a high/low luminance detection circuit 35; and a hold circuit 36 for holding output signals (data) of these detection circuits 33, 34 and 35. Here, the detection circuits 33 and 34 detect signal variation components in the illumination received by the CMOS sensor 11, and respectively determine the power supply frequency (50 Hz or 60 Hz) and the illumination frequency (high or low) of the light source (illumination). On the other hand, the high/low luminance detection circuit 35 detects and determines, based on the output signal of the CMOS sensor 11, whether the luminance of the illumination received by the CMOS sensor 11 is high or low. An electronic shutter of the CMOS sensor 11 of the solid state imaging device 1 is driven for a length of exposure time according to the thus determined frequency depending on the thus determined luminance.

Note here that each of the illumination frequency detection circuit 12 (50/60 Hz detection circuit 33 and high/low frequency detection circuit 34) and the high/low luminance detection circuit 35 is subjected to a loop process of detection, control and driving, so that once values of signal variation components and luminance are detected, it is needed to hold the set of these values using them as a trigger for the holding until the illumination next changes. The hold circuit 36 serves the function of such holding for a predetermined time, including holding of energy variation components of the light source in the output signal of the CMOS sensor 11. The set of values in the hold circuit 36 is reset by applying a reset signal to the hold circuit 36.

The control circuit 13 is designed to detect an imaging command from a user, and thereby start organizationally or systematically controlling the signal processing circuit 14, the drive circuit 15 and so on so as to totally control the process of the solid state imaging device 1. More specifically, the control circuit 13 serves to control the driving of the CMOS sensor 11 based on the signal detected by the illumination frequency detection circuit 12 (and the high/low luminance detection circuit 35), and to reduce level variation of the signal processed by the signal processing circuit 14 as will be described in detail with reference e.g. to the flow chart of FIG. 4 later. The signal processing circuit 14 further produces electronic data (e.g. image data) based on electrical signals received from the CMOS sensor 11, and outputs the produced electronic data to other circuits. The drive circuit 15 receives various drive commands mainly from the control circuit 13 so as to execute the drive commands to drive various elements such as the CMOS sensor 1. On the other hand, the storage unit 21, which is formed e.g. of a non-volatile memory, serves to store electronic data converted by the signal processing circuit 14.

<2. Correction Method for Level Variation and Flicker>

Figure 4:
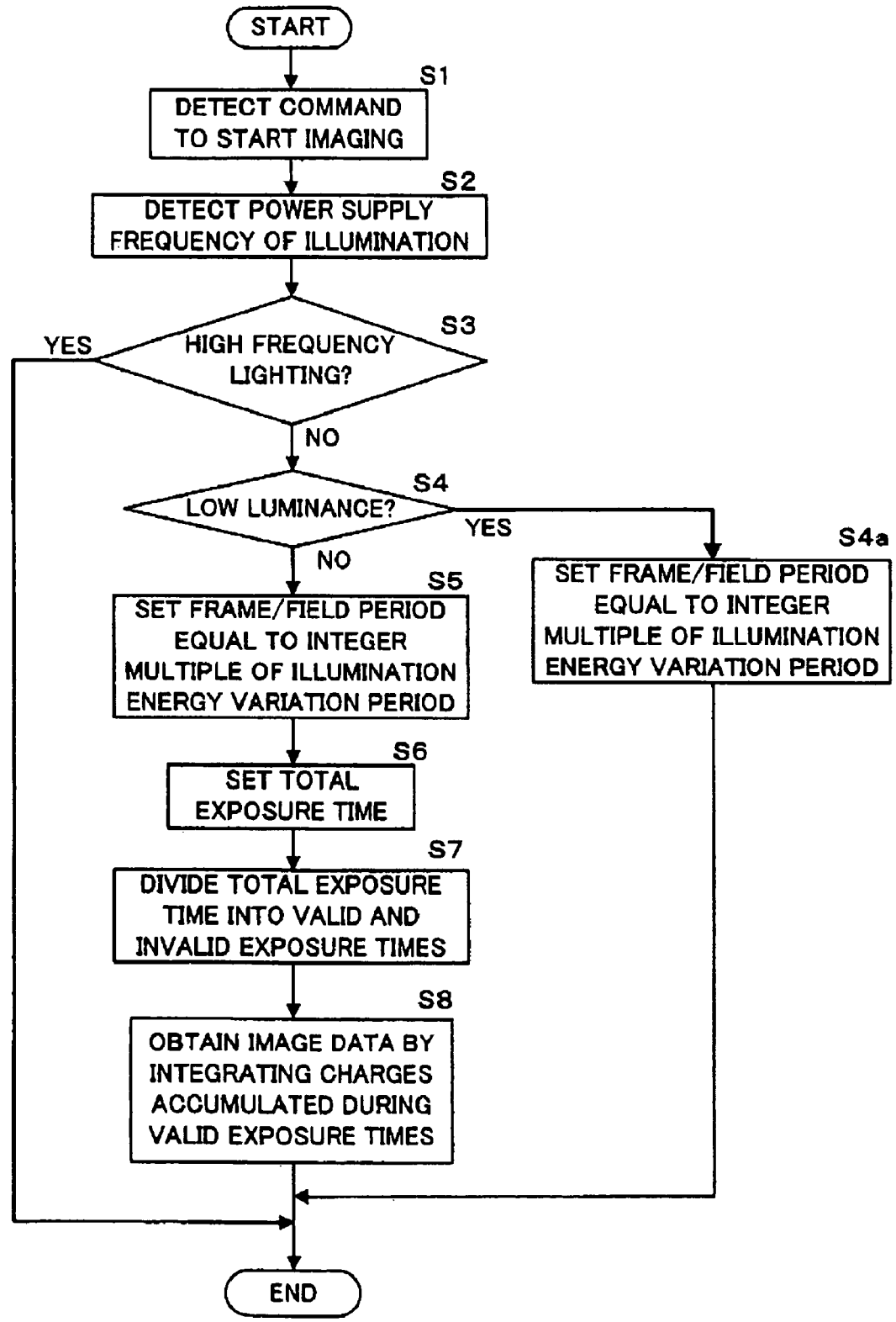
FIG. 4 is a flow chart showing a method for correcting level variation and flicker in a solid state imaging device according to the present invention.

Referring now to the flow chart of FIG. 4 and the timing charts of FIG. 5 and FIG. 6, a method or process for correcting level variation and flicker in a solid state imaging device 1 according to the present invention will be described. Referring to FIG. 4, when the control circuit 13 receives and detects an imaging command (command to start imaging) from a user (S1), the control circuit 13 is thereby activated and starts the method for correcting level variation and flicker.

Using the illumination frequency detection circuit 12, the control circuit 13 having received the imaging command determines the type of the illumination of a light source whether it has energy (level) variation. If the illumination has energy variation, the control circuit 13 controls the illumination frequency detection circuit 12 (50/60 Hz detection circuit 33 and high/low frequency detection circuit 34) to detect the frequency of the illumination (power supply frequency of the light source) (S2). For example, referring to FIG. 2, the sensor 31 detects and converts incident light (illumination) from the light source to signal charge. The amplifier 32 amplifies and sends the signal charge to the 50/60 Hz detection circuit 33, which determines based on the amplified signal charge whether the power supply frequency is 50 Hz or 60 Hz.

Next, based on the output signal of the 50/60 Hz detection circuit 33, the high/low frequency detection circuit 34 of the illumination frequency detection circuit 12 determines whether the frequency of the illumination detected in step S2 above is high (i.e. high frequency lighting) or low (i.e. low or normal frequency lighting) (S3). If it is not high, the process goes to the next step S4 as will be described later. On the other hand, if it is high, the process ends because it is not necessary to correct level variation or flicker for the following reason.

Figure 5:
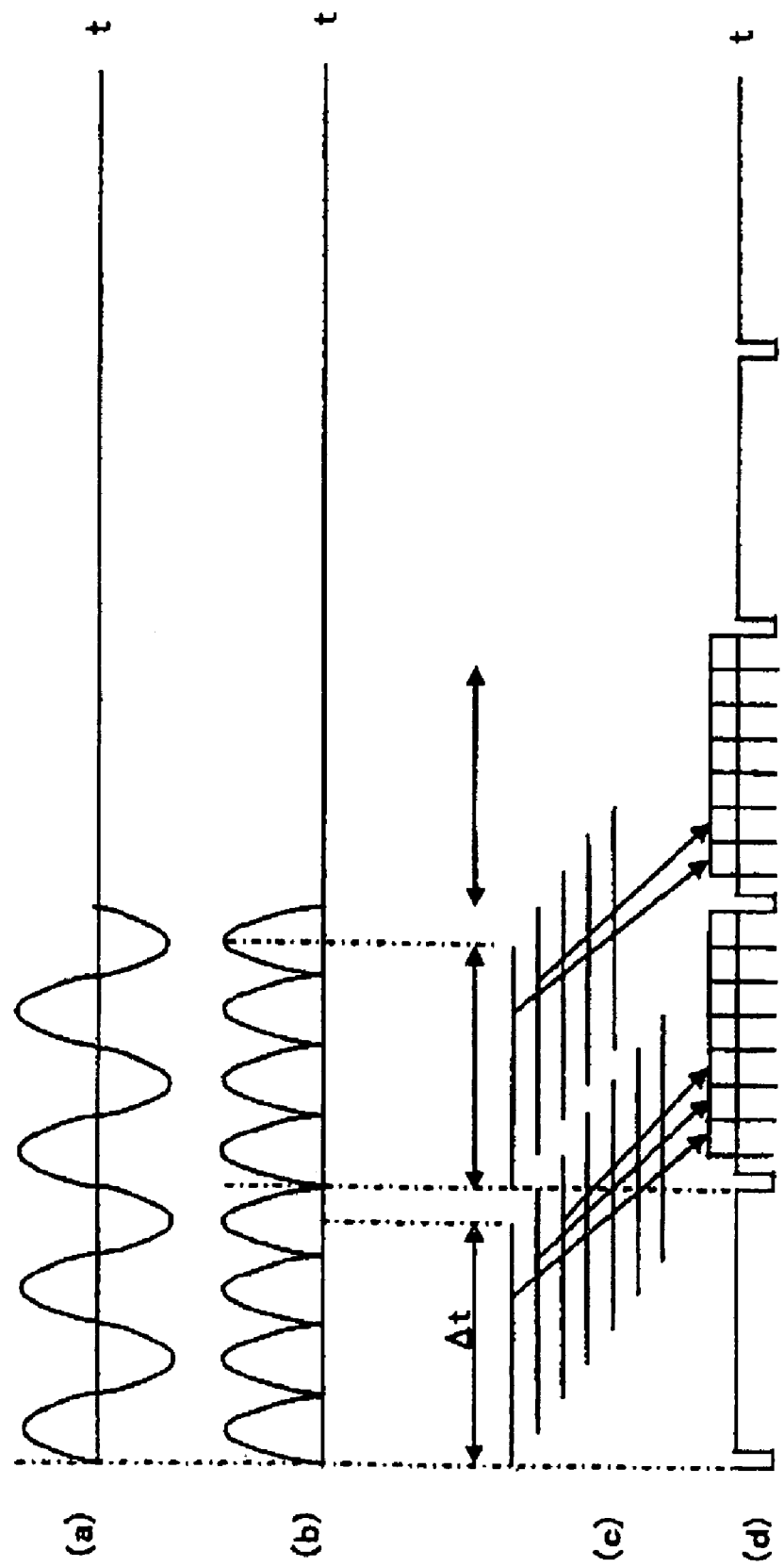
FIG. 5 is a timing chart of signals in the CMOS sensor under illumination (high frequency illumination) by a light source.

Reference is made to FIG. 5, which is a timing chart of signals in a CMOS sensor 11 under illumination (high frequency illumination) by a light source, where FIG. 5(a) is a graph showing a frequency (power supply frequency) of the light source, and FIG. 5(b) is a graph showing a period of energy variation of the light source (illumination frequency). On the other hand, FIG. 5(c) is a chart showing an exposure time for each scan line in sequential exposure for individual scan lines, while FIG. 5(d) is a graph showing a waveform of output signals from the individual scan lines, representing levels or amplitudes (i.e. amounts of energy) of the output signals in sequential fields (or frames).

Referring to FIG. 5, if the frequency detected in step S3 above is high, the period $\Delta t$ shown therein which is a period of the field or frame frequency of the CMOS sensor 11 is significantly longer than the period of the energy variation of the illumination shown in FIG. 5(b). Accordingly, the output signal waveform shown in FIG. 5(d) becomes an integration (sum) of the energy of the illumination corresponding to the exposure times of individual horizontal scan lines as represented by the sequential line segments shown in FIG. 5(c). As shown, the output signal waveform varies little with time, indicating that the output of the CMOS sensor 11 hardly varies. This indicates that it is not necessary to correct the level variation or flicker, so that the process of the flow chart of FIG. 4 is ended.

Referring back to FIG. 4, if the frequency detected in step S3 is not high, the high/low luminance detection circuit 35 (refer to FIG. 3) detects the luminance of incident light received by the CMOS sensor 11 (S4). If the detected luminance is low to eliminate the need to use an electronic shutter, the control circuit 13 can control the signal processing circuit 14 (and the drive circuit 15) to set the frame or field period (period of the frame or field frequency) to be equal to an integer multiple of the period of the energy variation of the illumination (S4a) so as to prevent variation of the output waveform of the CMOS sensor 11 from occurring. This makes it possible to correct flicker, so that the process of the flow chart of FIG. 4 is ended. On the contrary, if the detected luminance is high, requiring the exposure time of the electronic shutter of the CMOS sensor 11 to be shorter than the period of the energy variation of the illumination (or if incident light is not sufficiently controlled or reduced by a stop or aperture of a lens with the electronic shutter), then the process of step S4a cannot correct the variation of the output waveform of the CMOS sensor 11, so that the process goes to the next step S5.

In order to correct the variation of the output waveform of the CMOS sensor 11, the control circuit 13 controls the signal processing circuit 14 to detect the period of energy variation of illumination based on an output signal of the separate sensor 31 placed to face an object to be captured, or based on an output signal of the CMOS sensor 11 which contains energy variation components of the light source. Thus, the control circuit 13 and related elements serve as claimed "variation detecting means for detecting the period of energy variation of discharge type illumination". The control circuit 13 further controls to set a frame or field period, and also set, for each frame or field in imaging, a total exposure time to match the detected period of energy variation of the illumination. Thus, the control circuit 13 and related elements serve as claimed "exposure time determining means for determining an exposure time set for each frame or each field in imaging based on the period of energy variation detected by the variation detecting means".

More specifically, the control circuit 13 sets the frame or field period (period of the frame or field frequency) to be equal to an integer multiple of the period of the energy variation of the illumination (S5), and sets a total exposure time (S6) of the electronic shutter which is a hypothetical exposure time equal to an integer multiple of the period of the energy variation of the illumination (regardless of actual exposure time or times). This will be described with reference to FIG. 6, which is a timing chart of signals in the CMOS sensor 11 under illumination by a light source according to the solid state imaging device 1, where FIG. 6(*a*) is a graph showing a frequency of the light source, and FIG. 6(*b*) is a graph showing a period of energy variation of the light source, while FIG. 6(*c*) is a graph showing sequential fields (or frames). On the other hand, FIG. 6(*d*) is a chart showing a total exposure time Δt for each scan line in sequential exposure for individual scan lines, while each of FIG. 6(*e*) is a graph showing a waveform of output signals from the individual scan lines, representing levels or amplitudes (i.e. amounts of energy) of the output signals in sequential fields (or sequential frames).

Figure 6:
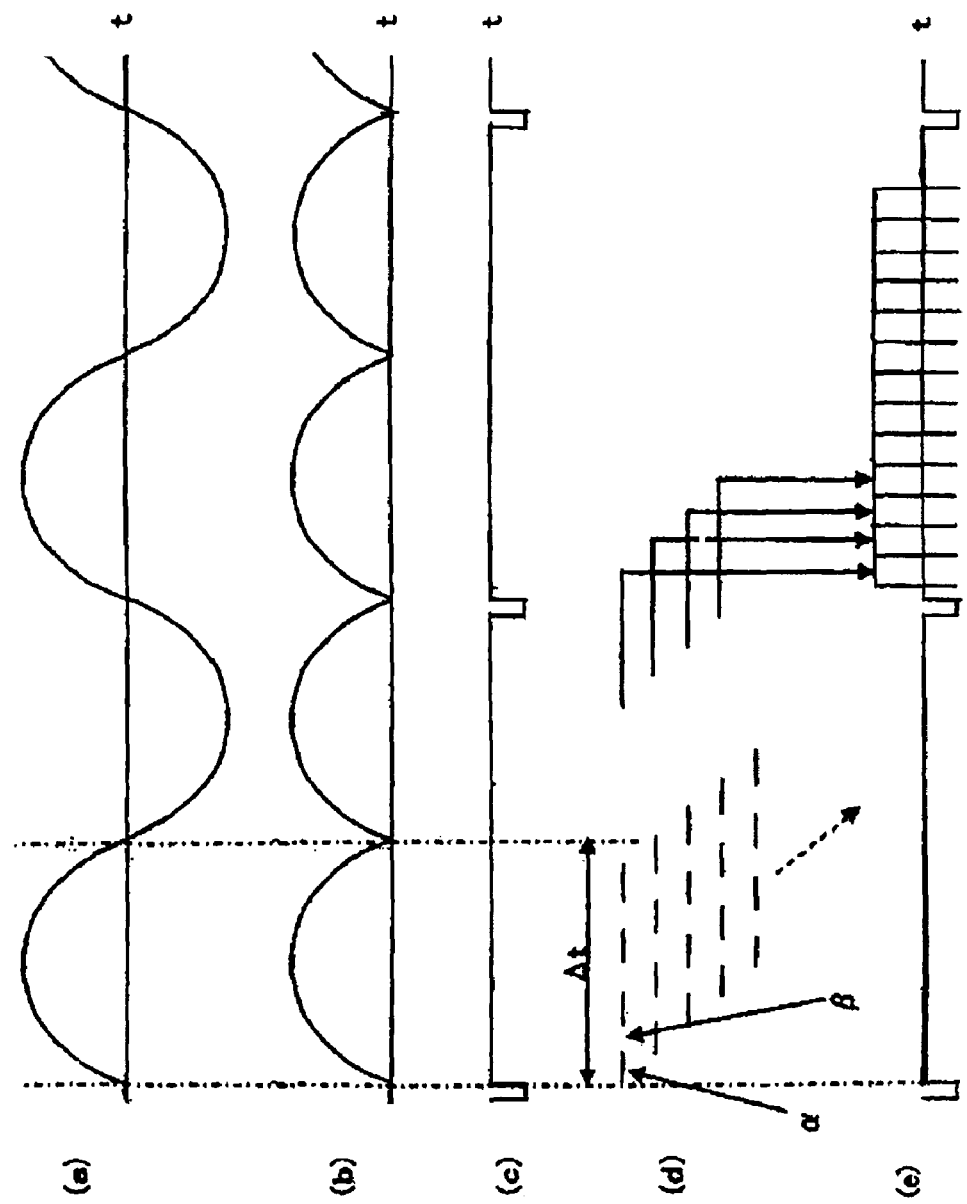
FIG. 6 is a timing chart of signals in the CMOS sensor under illumination by a light source according to a solid state imaging device of the present invention.

FIG. 6 shows an example in which the total exposure time Δt in FIG. 6(*d*) is set to be equal to, or 1 multiple of, the period of energy variation of the light source shown in FIG. 6(*b*). Referring to FIG. 6(*d*), the control circuit 13 controls the signal processing circuit 14 to divide the total exposure time Δt into multiple alternating exposure times, i.e. valid exposure times to accumulate charge as shown by solid line segments indicated by α, and invalid exposure times (between valid exposure times) not to accumulate charge as shown by blank areas indicated by β (S7). Thus, the control circuit 13 and relates elements serve as claimed "dividing means for dividing the exposure time (total exposure time) into a plurality of exposure times", and also as claimed "separating means for separating the plurality of exposure times, divided by the dividing means, into valid exposure times and invalid exposure times".

The control circuit 13 controls the signal processing circuit 14 to integrate the charges accumulated during the individual valid exposure times for each scan line (horizontal scan line) to signal charges, and to convert the signal charges to, and thereby obtain, an output signal (image data) for each scan line (S8). Thus, the control circuit 13 and related elements serve as claimed "selective output means for selectively integrating charges accumulated in the imaging means during the valid exposure times among charges accumulated in the imaging means during the exposure time (total exposure time), and for outputting a signal based on the integrated charges". Referring to FIG. 6, the total exposure time Δt is a hypothetical exposure time of the electronic shutter adjusted (matched) or equal to the period of energy variation of the illumination, whereas the actually used charges are those accumulated during the valid exposure times, i.e. sum of the solid line segments indicated by α in FIG. 6(*d*), corresponding to the total exposure time from which the invalid exposure times are excluded.

In the manner described above, the total exposure time is divided into the alternating valid and invalid exposure times by a division ratio to adjust the valid and invalid exposure times, such that the sum of the valid exposure times is equal to an actual exposure time (exposure time corresponding to an actual speed of the electronic shutter). Since the length of the total exposure time is synchronized or equal to the period of energy variation of the illumination, the output waveform representing the amount (or magnitude) of the accumulated charges becomes substantially constant or uniform. The uniformity of the output waveform increases with the increase in the number of divisions of the total exposure time.

<3. Circuit Structure of CMOS Sensor>

Figure 7:
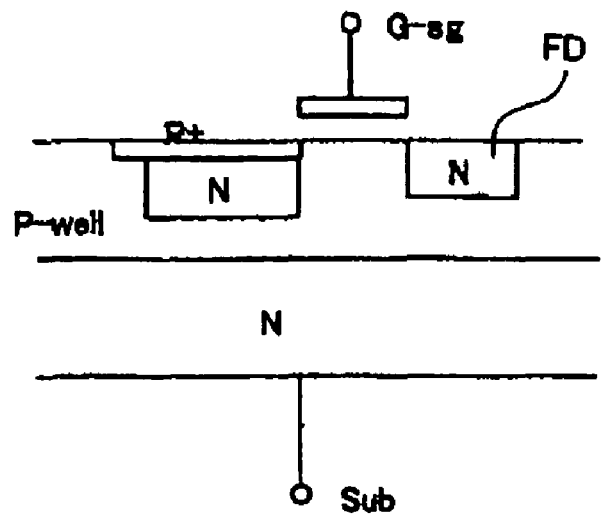
FIG. 7 is a schematic cross-sectional side view of an example of a photodiode in a cell of the CMOS sensor which can be used in the present invention.
Figure 8:
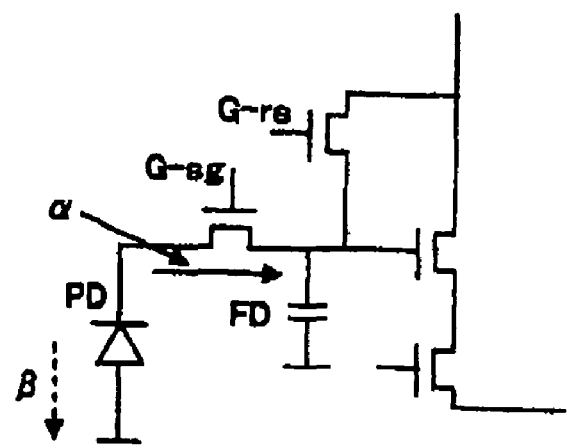
FIG. 8 is a circuit diagram showing a pixel circuit of a sensor cell with the photodiode.

Referring now to FIG. 7 and FIG. 8, the following describes an example of the structure of a CMOS sensor 11 used to perform the process of accumulating charge in steps S7 and S8 in <2. Correction Method for Level Variation and Flicker> described above, more specifically, the process of accumulating charge in the valid exposure times, and draining charge in the invalid exposure times.

FIG. 7 is a schematic cross-sectional side view of an example of a PD (photodiode) in a cell of a CMOS sensor 11 which can be used in the present invention. As shown, a P-well (P type layer) is formed on an N-sub (N type substrate). An impurity such as arsenic (As: N type semiconductor) is injected into the P-well to form a PD. If necessary, it is possible to form a P$^+$ layer on the PD to form a buried PD to reduce dark current. A floating diffusion (FD) (serving as a capacitor) for storing (accumulating) charge and a readout gate (G-sg) for transferring charge of the PD to the FD are provided adjacent to the PD, while a reset gate (G-rs) is also provided to reset the FD.

FIG. 8 is a circuit diagram showing a pixel circuit (equivalent circuit) of a cell (sensor cell) with the above-described PD. Referring to FIG. 8, among signal charges accumulated in the PD by its reception of incident light (exposure), the charges (only the charges) generated and accumulated during the individual valid exposure times are transferred to the FD by the readout gate G-sg as indicated by the arrow α in FIG. 8, whereas the other charges generated in the individual invalid exposure times are drained (to the N-sub) as indicated by the dashed arrow β in FIG. 8. The charges, which are separately and intermittently accumulated during the individual valid exposure times, are integrated at the FD, and a signal voltage (electrical signal) corresponding to and converted from the thus integrated charges is output externally (to the signal processing circuit 14).

<4, Driving of Readout Gate>

Figure 9:
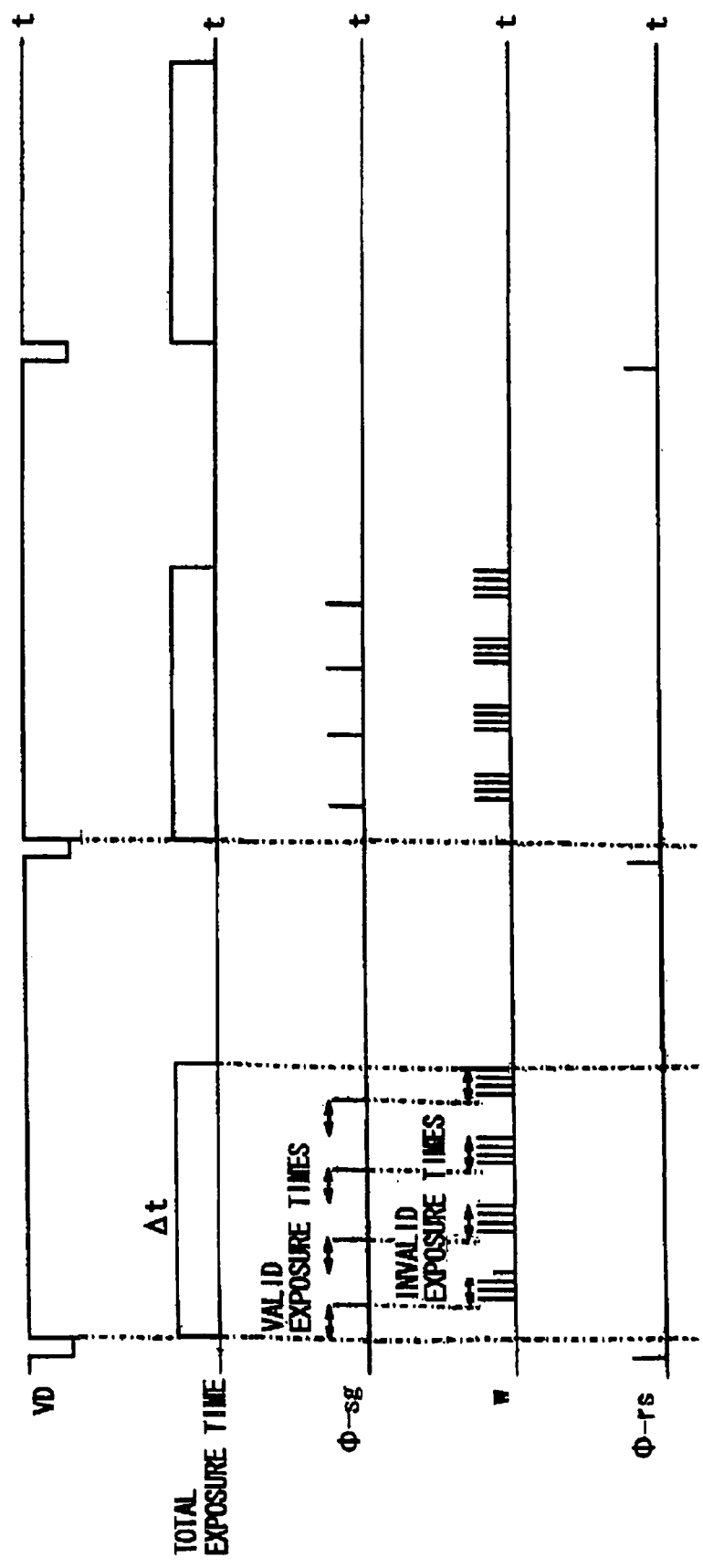
FIG. 9 is a timing chart showing relationships between potential applied to a P-well and pulses to drive a photodiode, a readout gate and a reset gate in sequential fields or frames according to a solid state imaging device of the present invention.

FIG. 9 is a timing chart showing the relationships between potential (w) applied to a P-well and pulses to drive a PD, a readout gate G-sg and a reset gate G-rs in sequential fields (or frames) in the solid state imaging device 1. In FIG. 9, the uppermost line, VD, is vertical sync showing sequential fields (or frames), while Δt in one field (or frame) is total exposure time which is set to be equal to the period, or an integer multiple of the period, of the energy variation of illumination. On the other hand, φ-sg and φ-rs are pulses applied to the readout gate G-sg and the reset gate G-rs in <3. Circuit Structure> described above, respectively. These will be described in detail below.

Referring to FIG. 9, φ-rs is a train of pulses to be applied to the reset gate G-rs shown in FIG. 8 for resetting the FD. The application of a pulse φ-rs causes charge stored (accumulated) in the FD to be reset. On the other hand, φ-sg is a train of pulses to be applied to the readout gate G-sg shown in FIGS. 7 and 8 for transferring and storing valid charges to and in the FD. More specifically, the application of a pulse φ-sg causes the readout gate G-sg to be ON, whereby the charge accumulated during the valid exposure time is transferred and accumulated to and in the FD as indicated by the arrow α shown in FIG. 8. Thus, when the PD receives incident light (exposure) during a first valid exposure time following the reset of the FD by a first pulse φ-rs in the total exposure time Δt in a first field (or frame), charge is accumulated in the PD during the first valid exposure time, and is read out and stored in the FD by the application of a first pulse φ-sg.

The potential w is applied to the P-well shown in FIG. 7 during each invalid exposure time following each valid exposure time so as to drain invalid charge accumulated in the PD during the invalid exposure time to the N-sub shown in FIG. 7. Thus, when the potential w is applied to the P-well during a first invalid exposure time following the first pulse φ-sg (i.e. following the first valid exposure time), charge accumulated in the PD during the first invalid exposure time is drained to the N-sub. Thereafter, charge is again accumulated in the PD by its reception of incident light (exposure) during a second or subsequent valid exposure time following the first invalid exposure time. The charge accumulated in the PD during the second valid exposure time is read out and stored in the FD by the application of a second or subsequent pulse φ-sg. By repeating this process, the charges (only the charges) generated and accumulated during the valid exposure times, among the charges accumulated in the PD during the total exposure time Δt, are output to an external circuit. By sequentially repeating this process for each field (or frame), image data can be read out from the PD (CMOS sensor 11).

Figure 10:
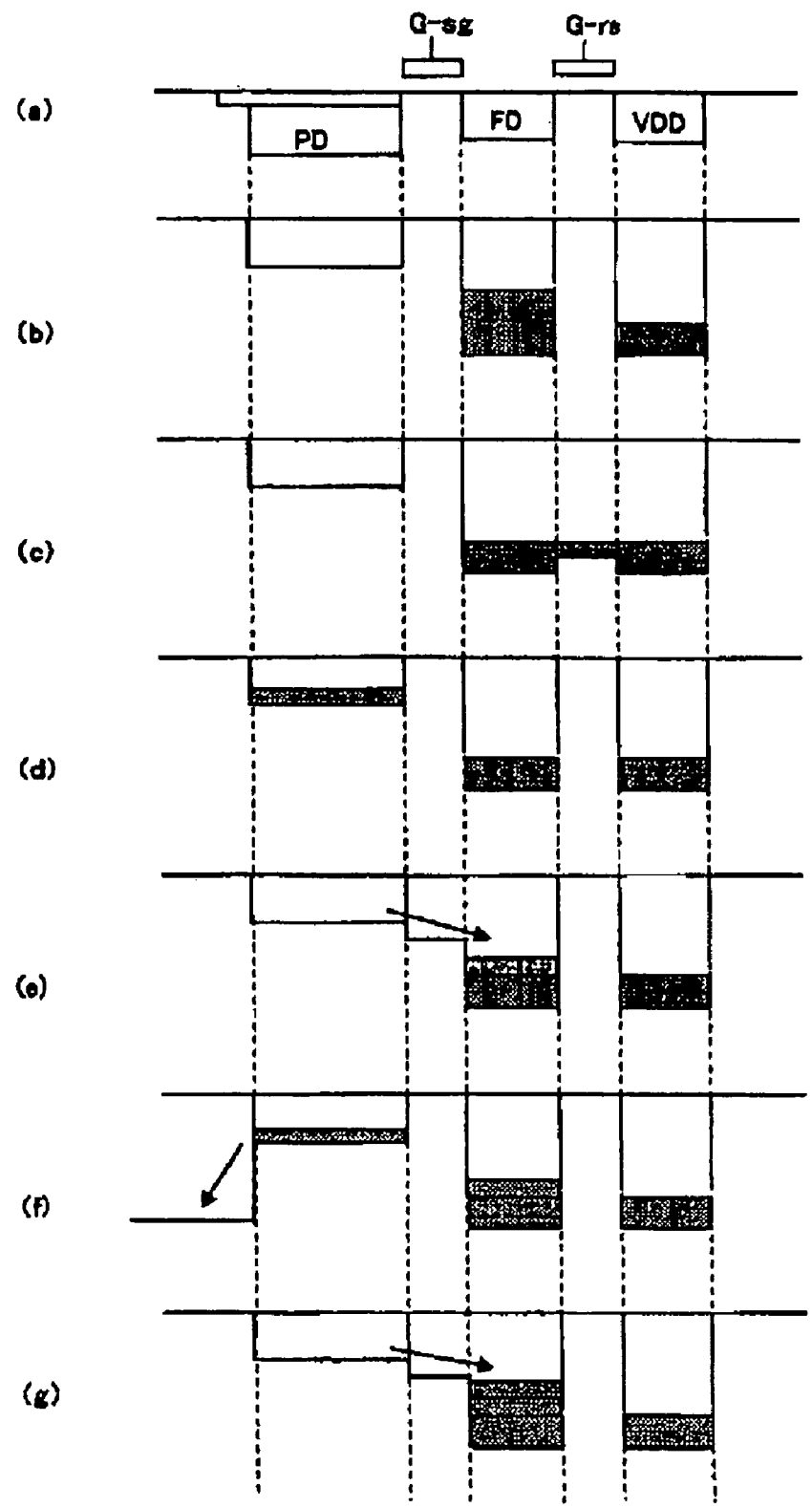
FIG. 10 is a conceptual diagram showing movement of charge in the pixel circuit of FIG. 8.

Referring now to FIG. 10, which is a conceptual diagram showing movement or transfer of charge (change in the amount of charge) in the pixel circuit shown in FIG. 8, the operations of the above-described readout gate G-sg and the reset gate G-rs will be described in more detail below. In FIG. 10, FIG. 10(a) is a conceptual view of a cell of the CMOS sensor 11, focusing on particular regions and elements therein that are a photodiode (PD), a floating diffusion (FD), a reset drain (VDD), a readout gate (G-sg) and a reset gate (G-rs), while each of FIGS. 10(b) to 10(g) is a conceptual diagram showing amounts of charge, as indicated by shading, in the respective regions at six different stages, respectively.

As shown in FIG. 10(b), which shows an example of an initial state, there is a possibility that charge stored (accumulated) in the FD in a preceding step may remain in the FD in the initial state. Accordingly, as shown in FIG. 10(c), the CMOS sensor 11 is reset by applying a pulse φ-rs to the reset gate G-rs. After the reset, the PD photoelectrically converts incident light to charge according to the amount of incident light, and accumulates the charge as shown in FIG. 10(d). If the charge in the PD is accumulated during a valid exposure time, the accumulated charge in the PD is moved or transferred to the FD by applying a pulse φ-sg to the readout gate G-sg as shown in FIG. 10(e). When the application of the pulse φ-sg is stopped thereafter, the PD returns to the state where it can accumulate charge again according to the amount of incident light. On the other hand, if the charge in the PD is accumulated during an invalid exposure time, the accumulated charge in the PD is absorbed by the N-sub by applying the potential w to the P-well, whereby the PD becomes depleted of charge as shown in FIG. 10(f). When the application of the potential w is stopped thereafter, the PD returns to the state where it can resume accumulating charge according to the amount of incident light.

When the PD resumes accumulating charge, the PD continues to accumulate charge until the next application of pulse φ-sg or potential w. If a pulse φ-sg is applied to the readout gate G-sg again, the charge then accumulated in the PD is added to the charge transferred to and remaining in the FD in a preceding process, so that these charges are integrated in the FD as shown in FIG. 10(g). By repeating this process until the end of the total exposure time, the charges (only the charges) accumulated in the PD during the individual valid exposure times are read out as signal charges. Accordingly, although the total exposure time is limited by the length of an integer multiple of the period of energy variation of illumination, the valid exposure times can be freely set. Thus, the variation of output signals generated in the CMOS sensor 11 under the discharge type light source can be reduced.

<5. Method of Draining Charge for Each Scan Line>

Figure 11A:
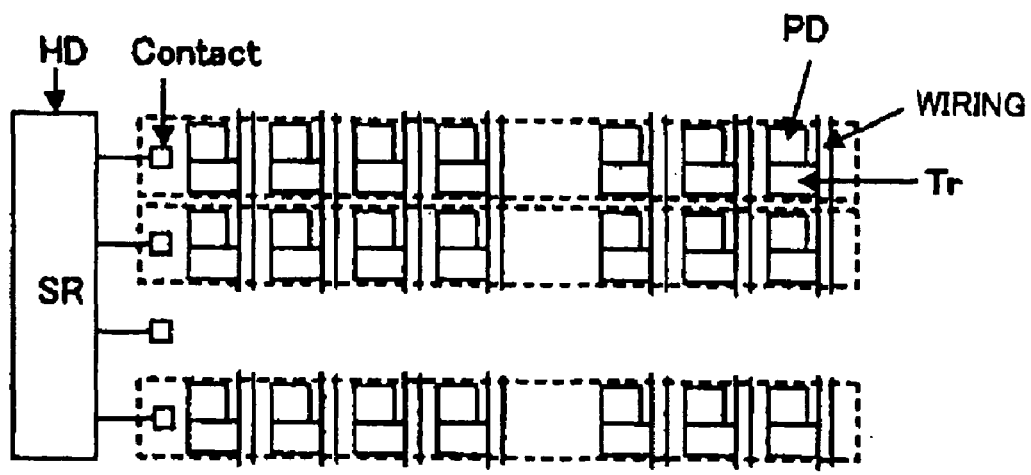
FIG. 11A is a schematic plan view of a part of the CMOS sensor showing its structure for each scan line.
Figure 11B:
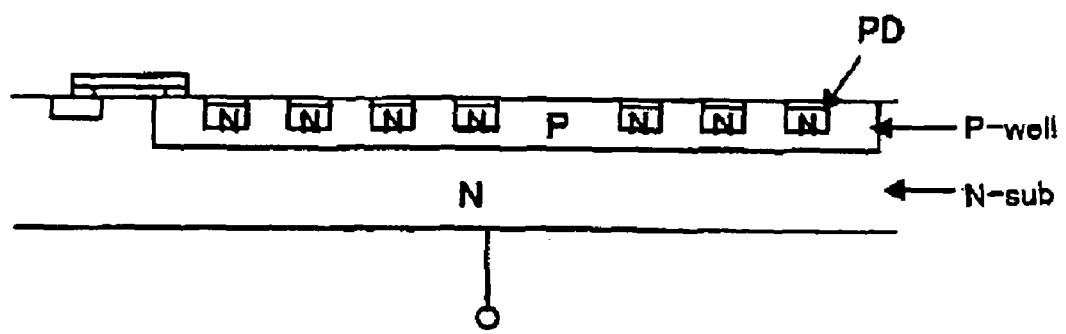
FIG. 11B is a schematic cross-sectional view of the part of the CMOS sensor of FIG. 11A.
Figure 12:
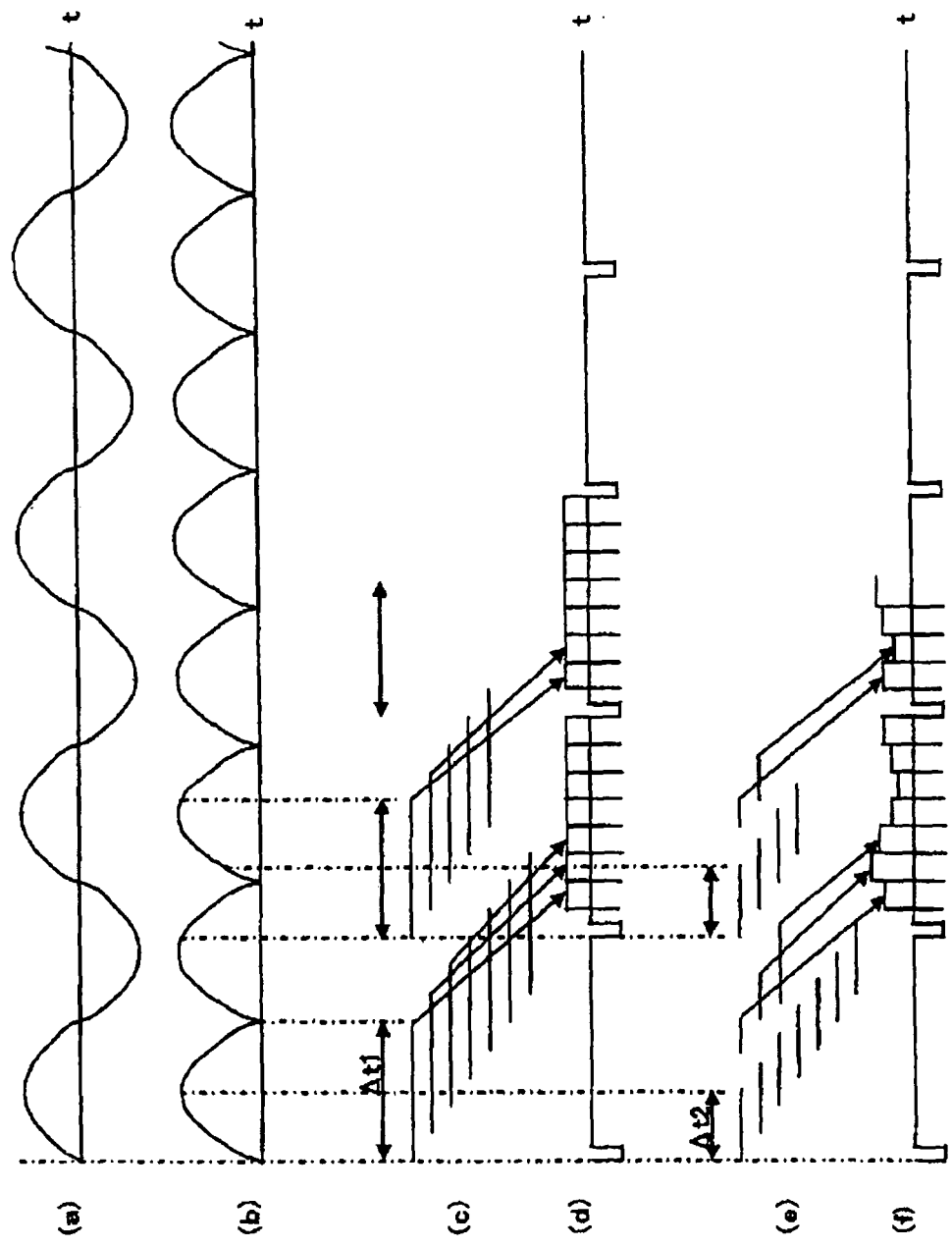
FIG. 12 is a timing chart of signals in a CMOS sensor under illumination by a light source according to a conventional solid state imaging device.
Figure 13:
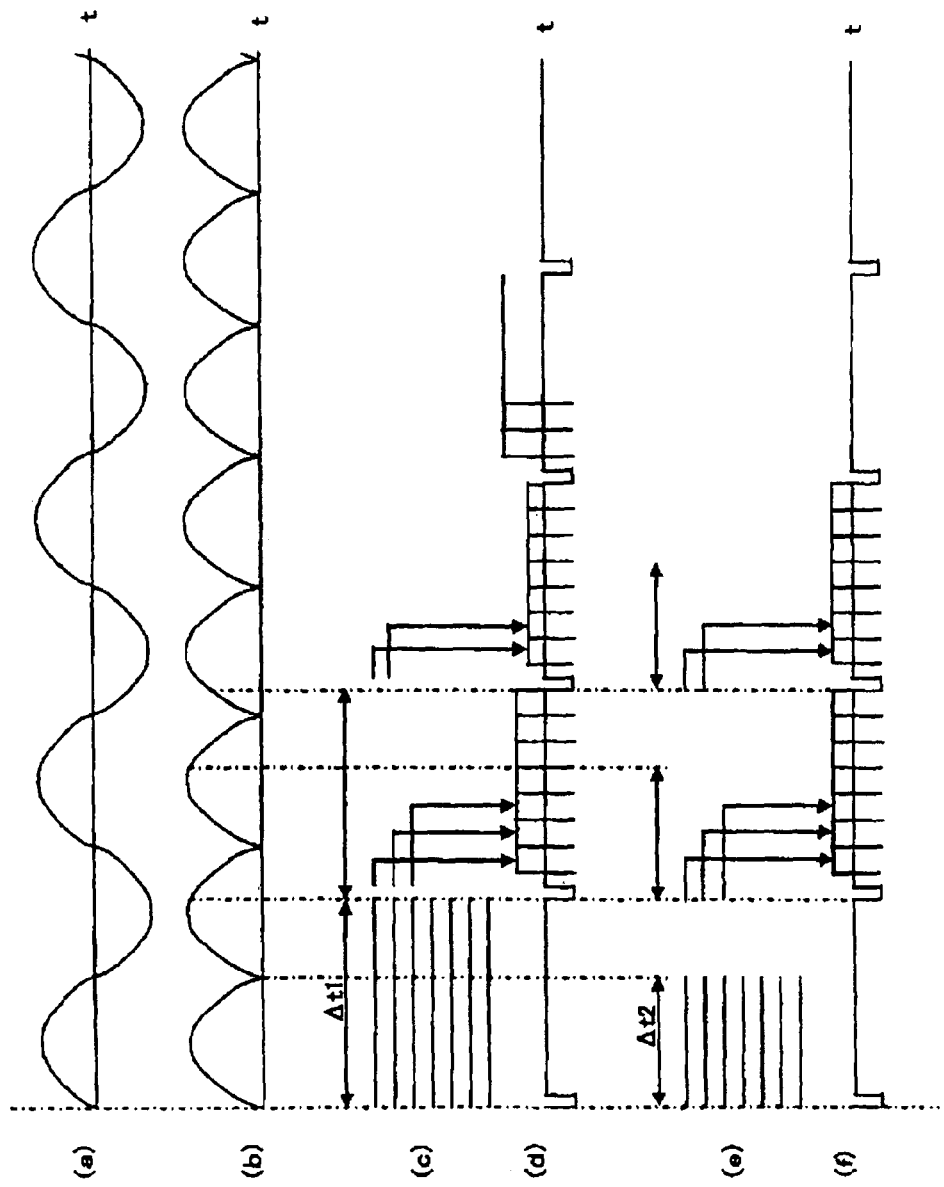
FIG. 13 is a timing chart of signals in a CCD sensor under illumination by a light source according to a conventional solid state imaging device.

Referring to FIG. 11A and FIG. 11B, a method of draining charge in one or each scan line as shown in FIG. 10(f) will be described. FIG. 11A is a schematic plan view of a part of the CMOS sensor 11 showing its structure for each scan line. Referring to FIG. 11A, each area enclosed by a dashed line corresponds to a set of a P-well and PDs in the P-well, which is constructed separately for each individual horizontal scan line. That is, one P-well is present in one horizontal scan line. FIG. 11B is a schematic cross-sectional view of the part of the CMOS sensor 11 of FIG. 11A. Referring to these drawings, each N type PD, the P-well and the N-sub vertically form an N-P-N type transistor (Tr).

The CMOS sensor 11 having the structure described above operates such that when potential w is applied to the P-well, charges (only charges) in the PDs in the P-well are drained to the N-sub. Thus, when draining is necessary, a horizontal scan line is selected by a shift register (SR), and the potential w is applied to the P-well corresponding to the selected horizontal scan line, whereby the charges (only the charges) in the PDs of the selected horizontal scan line can be drained. Note that the SR which is connected to each contact connecting each wiring to the silicon substrate is driven by a horizontal sync signal (HD). Thus, using this draining method, charges accumulated during an invalid exposure time or times can be drained to the substrate (N-sub) at an optional timing for a selected scan line or lines, scan line by scan line, independently in a solid state imaging device, for example, with a CMOS sensor of four transistor (4T) type (in which the resetting of charge of a PD is not performed by using a reset transistor) by selecting or assigning the scan line or lines, scan line-by-scan line.

As described in the foregoing, the solid state imaging device 1 according to an embodiment of the present invention detects the period of energy variation of discharge type illumination, and sets a total exposure time (i.e. time in which charges are accumulated by a light receiving element as in CMOS sensor 11) to match the detected period of energy variation of the discharge type illumination. The total exposure time is divided into alternating valid and invalid exposure times by a division ratio to make the sum of the valid exposure times equal to an actual exposure time corresponding to an actual speed of an electronic shutter. Charges accumulated in the CMOS sensor 11 during the valid exposure times are stored in a floating diffusion (FD) which serves as a capacitor, whereas charges accumulated during the invalid exposure times are drained. At the end of the total exposure time, the charges (only the charges) stored during the valid exposure times are converted to an electrical signal which is output to a signal processing circuit 14 of the solid state imaging device 1.

Thereby, when the electronic shutter is operated for imaging under high luminance illumination, this solid state imaging device 1 can correct variation of output signals which corresponds to the illumination energy variation. Thus, the solid state imaging device 1, which has a simple and inexpensive configuration, can reduce or correct level variation of output signals caused by variation in amount of energy of illumination when imaging using a solid state imaging element such as CMOS sensor 11 under discharge type illumination e.g. with high luminance. In this way, even if the CMOS sensor 11 has improved sensitivity to cause short exposure time, the solid state imaging device 1 can correct the level variation of output signals even beyond the limitation of the conventional correction method, which is a method to make the period of the illumination energy variation equal to the exposure time of an electronic shutter or to the frame (field) rate.

It is to be noted that the present invention is not limited to the above embodiments, and various modifications are possible within the technical concept of the present invention. First, as a matter of course, the functions of the solid state imaging device as performed by hardware according to the above embodiments can be performed by software. For example, it is possible to provide the solid state imaging device having the CMOS sensor with a recording medium, which stores program codes of software to perform the functions of the solid state imaging device, such that a computer (CPU) of the solid state imaging device reads and executes the program codes stored in the recording medium so as to achieve the functions.

It is needless to say that this modification includes an option to further provide the solid state imaging device with a function expansion board inserted in the computer or a function expansion unit connected to the computer, in which the function expansion board or the function expansion unit has its own computer (CPU) and a memory for storing program codes. After the program codes read out from the recording medium provided in the solid state imaging device) are written to the memory, the function expansion board or the function expansion unit can use e.g. the own computer to perform an actual process based on commands of the program codes, so as to achieve the functions of the solid state imaging device according to the embodiments described above. In this case, the program codes themselves read out from the recording medium achieve the functions of the solid state imaging device, so that the recording medium storing the program codes forms a part of the solid state imaging device of the present invention.

Examples of the solid state imaging device having a CMOS sensor are a digital still camera, a video camera, a camcorder, a cellular phone, a PDA (Personal Digital Assist), a notebook personal computer, and so on. Besides, the functions of the solid state imaging device according to the embodiments of the present invention described above can be achieved with other types of solid state imaging elements than the CMOS sensor, such as a CCD sensor. In addition, needless to say, the functions can also be achieved with a circuit, such as in a single-chip camera, which itself serves as an imaging device.

The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

This application is based on Japanese patent application 2005-182744 filed Jun. 23, 2005, the content of which is hereby incorporated by reference.

What is claimed is:

1. A solid state imaging device comprising:
a variation detecting means for detecting the period of energy variation of discharge type illumination;
an exposure time determining means for determining an exposure time set for each frame or each field in imaging based on the period of energy variation detected by the variation detecting means;
an imaging means for imaging, using an X-Y address type solid state imaging element for photoelectrically converting incident light to charges and accumulating the charges in an exposure time;
a dividing means for dividing the exposure time into a plurality of exposure times;
a separating means for separating the plurality of exposure times, divided by the dividing means, into valid exposure times and invalid exposure times; and
a selective output means for selectively integrating charges accumulated in the imaging means only during the valid exposure times among charges accumulated in the imaging means during the exposure time, and for outputting a signal based on the integrated charges,
wherein among the charges accumulated by the imaging means, the charges accumulated during the invalid exposure times are drained scan line-by-scan line to a substrate of the imaging element.

2. The solid state imaging device according to claim 1, wherein the variation detecting means uses a light receiving element, placed to face an object to be captured, for detecting the period of energy variation of the discharge type illumination.

3. The solid state imaging device according to claim 2, wherein the variation detecting means detects the period of energy variation of illumination based on an output signal of the imaging element in which the output signal of the imaging element contains energy variation components of the light source, the energy variation components of the light source being held for a predetermined time.

4. The solid state imaging device according to claim 1, wherein the variation detecting means detects the period of energy variation of illumination based on an output signal of the imaging element in which the output signal of the imaging element contains energy variation components of the light source, the energy variation components of the light source being held for a predetermined time.

5. The solid state imagine device according to claim 1, wherein a sum of the valid exposure times is made to equal to an actual exposure time corresponding to an actual speed of an electronic shutter.

6. A solid state imaging device comprising:
a variation detecting means for detecting the period of energy variation of discharge type illumination;
an exposure time determining means for determining an exposure time set for each frame or each field in imaging based on the period of energy variation detected by the variation detecting means;
an imaging means for imaging, using an X-Y address type solid state imaging element for photoelectrically converting incident light to charges and accumulating the charges in an exposure time;
a dividing means for dividing the exposure time into a plurality of exposure times;
a separating means for separating the plurality of exposure times, divided by the dividing means, into valid exposure times and invalid exposure times; and
a selective output means for selectively integrating charges accumulated in the imaging means only during the valid exposure times among charges accumulated in the imaging means during the exposure time, and for outputting a signal based on the integrated charges,
wherein the variation detecting means (i) uses a light receiving element, placed to face an object to be captured, for detecting the period of energy variation of the discharge type illumination; or (ii) detects the period of energy variation of illumination based on an output signal of the imaging element in which the output signal of the imaging element contains energy variation components of the light source, the energy variation components of the light source being held for a predetermined time, and wherein among the charges accumulated by the imaging means, the charges accumulated during the invalid exposure times are drained scan line-by-scan line to a substrate of the imaging element.

7. The solid state imaging device according to claim 6,
wherein a sum of the valid exposure times is made to equal to an actual exposure time corresponding to an actual speed of an electronic shutter.

8. A method for a solid state imaging device comprising:
detecting a period of energy variation of discharge type illumination;
determining an exposure time set for each frame or each field in imaging based on the detected period of energy variation;
using an X-Y address type solid state imaging element for photoelectrically converting incident light to charges and accumulating the charges in an exposure time;
dividing the exposure time into a plurality of exposure times;
separating the plurality of exposure times into valid exposure times and invalid exposure times;
selectively integrating charges accumulated only during the valid exposure times among charges accumulated during the exposure time; and
outputting a signal based on the integrated charges,
wherein among the accumulated charges, the charges accumulated during the invalid exposure times are drained scan line-by-scan line to a substrate of the imaging element.

9. The method according to claim 8, wherein a light receiving element, arranged to face an object to be captured, detects the period of energy variation of the discharge type illumination.

10. The method according to claim 9, wherein the detection of the period of energy variation of illumination is based on an output signal of the imaging element in which the output signal of the imaging element contains energy variation components of the light source, the energy variation components of the light source being held for a predetermined time.

11. The method according to claim 8, wherein the detection of the period of energy variation of illumination is based on an output signal of the imaging element in which the output signal of the imaging element contains energy variation components of the light source, the energy variation components of the light source being held for a predetermined time.

12. The method according to claim 8,
wherein a sum of the valid exposure times is made to equal to an actual exposure time corresponding to an actual speed of an electronic shutter.

* * * * *